(12) United States Patent
Feuer et al.

(10) Patent No.: US 7,027,733 B2
(45) Date of Patent: Apr. 11, 2006

(54) DELIVERING MULTICAST SERVICES ON A WAVELENGTH DIVISION MULTIPLEXED NETWORK USING A CONFIGURABLE FOUR-PORT WAVELENGTH SELECTIVE CROSSBAR SWITCH

(75) Inventors: Mark D. Feuer, Colts Neck, NJ (US);
Nicholas J. Frigo, Red Bank, NJ (US);
Cedric F. Lam, Middletown, NJ (US)

(73) Assignee: AT&T Corp., New York, NY (US)

( * ) Notice: Subject to any disclaimer, the term of this patent is extended or adjusted under 35 U.S.C. 154(b) by 681 days.

(21) Appl. No.: 10/026,888

(22) Filed: Dec. 27, 2001

(65) Prior Publication Data

US 2002/0131117 A1    Sep. 19, 2002

Related U.S. Application Data

(60) Provisional application No. 60/276,495, filed on Mar. 19, 2001, provisional application No. 60/276,485, filed on Mar. 19, 2001.

(51) Int. Cl.
*H04J 14/00* (2006.01)

(52) U.S. Cl. .............................. 398/72; 398/59; 398/66; 398/67; 398/68; 398/69; 398/70; 398/71; 398/79; 398/82; 398/83; 398/45; 398/48; 398/50; 398/58; 398/56

(58) Field of Classification Search .................. 398/59, 398/66, 67, 68, 69, 70, 71, 72, 79, 82, 83, 398/45, 48, 50, 58, 56
See application file for complete search history.

(56) References Cited

U.S. PATENT DOCUMENTS 5,559,624 A    9/1996  Darcie et al.
5,923,449 A *  7/1999  Doerr et al. .................... 398/7
5,930,016 A *  7/1999  Brorson et al. ............... 398/79
5,940,197 A    8/1999  Ryu (Continued)

FOREIGN PATENT DOCUMENTS

EP    1 039 670    9/2000

OTHER PUBLICATIONS

Stuart S. Wagner, et al., "Multiwavelength Ring Networks for Switch Consolidation and Interconnection", Discovering A New World Of Communications, IEEE Conference, vol. 3, Jun. 14, 1992, pp. 1173-1179.

N. Fujimoto, et al., "Broadband Subscriber Loop System Using Multi-Gigabit Intelligent Optical Shuttle Nodes",, Global Telecommunications Conference, IEEE, vol. 3, Nov. 15, 1987, pp. 1449-1454.

(Continued)

*Primary Examiner*—Hanh Phan

(57) ABSTRACT

A method and a system in which selected wavelengths of a wavelength division multiplexed (WDM) signal are modulated with multicast data for multicasting data services on an optical network. The WDM signal is received from a hub node of the optical network, such as a unidirectional ring network or a bi-directional ring network. A four-port wavelength crossbar switch (4WCS) selectably switches selected wavelengths from the optical network to a modulator loop. The modulator loop includes a multicast modulator that modulates the selected plurality of wavelengths with the multicast data. Each modulated wavelength is then switched back to the optical network by the 4WCS switch, and sent to a plurality of subscriber nodes of the optical network. This architecture allows a facility provider to be physically separated from a content provider, and affords the flexibility of selectively delivering multicast content to individual subscribers.

17 Claims, 8 Drawing Sheets

U.S. PATENT DOCUMENTS

| | | |
|---|---|---|
| 5,940,551 A | 8/1999 | Oberg |
| 6,067,389 A | 5/2000 | Fatehi et al. |
| 6,091,869 A | 7/2000 | Sundelin |
| 6,097,533 A | 8/2000 | Atlas |
| 6,122,095 A | 9/2000 | Fatehi |
| 6,130,765 A | 10/2000 | Gautheron et al. |
| 6,175,432 B1 | 1/2001 | Wu et al. |
| 6,181,849 B1 | 1/2001 | Lin et al. |
| 6,195,187 B1 | 2/2001 | Soref et al. |
| 6,201,909 B1 | 3/2001 | Kewitsch et al. |
| 6,205,267 B1 | 3/2001 | Aksyuk et al. |
| 6,211,980 B1 | 4/2001 | Terahara |
| 6,212,314 B1 | 4/2001 | Ford |
| 6,233,074 B1 * | 5/2001 | Lahat et al. .................. 398/79 |
| 6,275,329 B1 | 8/2001 | Sieben |
| 6,288,810 B1 | 9/2001 | Grasso et al. |
| 6,289,145 B1 | 9/2001 | Solgaard et al. |
| 6,295,397 B1 | 9/2001 | Augustsson |
| 6,351,323 B1 * | 2/2002 | Onaka et al. .................. 398/84 |

OTHER PUBLICATIONS

Adel A. J. Saleh, et al., "Architectural Principles of Optical Regional and Metropolitan Access Networks", Journal Of Lightwave Technology, vol. 17, No. 12, Dec. 1999, pp. 2431-2448.

Tadasu Ishikawa, et al., "$LiNbO_3$ Optical Waveguide Modulator for Bidirectional Transmission", Electronics and Communications in Japan, Part 2, vol. 77, No. 9, Sep. 1994, pp. 85-94.

Cedric F. Lam , et al., "Programmable Optical Multicasting in a Regional/Metro Area Network Using A Wavelength Selective Optical Cross-connect", Proceedings 27th European Conference On Optical Communications ECOC '01, vol. 4, Sep. 30, 2001, pp. 614-615.

* cited by examiner

DELIVERING MULTICAST SERVICES ON A WAVELENGTH DIVISION MULTIPLEXED NETWORK USING A CONFIGURABLE FOUR-PORT WAVELENGTH SELECTIVE CROSSBAR SWITCH

The present application claims priority to provisional U.S. Patent Application Ser. No. 60/276,495, entitled "Delivering Multicast Services On A Wavelength Division Multiplexed Network Using a Configurable Four-Port Wavelength Selective Crossbar Switch," invented by Mark D. Feuer et al., filed Mar. 19, 2001, and incorporated by reference herein. Additionally, the present application is related to provisional U.S. Patent Application Ser. No. 60/276,485, entitled "Four-Port Wavelength Selective Crossbar Switches (4WCS) Using Reciprocal WDMS and Optical Circulator Combination," invented by Mark D. Feuer et al., filed Mar. 19, 2001, and to U.S. patent application Ser. No. 10/026,837, entitled "Four-Port Wavelength Selective Crossbar Switches (4WCS) Using Reciprocal WDM MUX-DEMUX and Optical Circulator Combination," invented by Mark D. Feuer et al., filed concurrently with the present application, and each of which is incorporated by reference herein.

BACKGROUND OF THE INVENTION

1. Field of the Invention

The invention relates to a wavelength division multiplexed (WDM) network. More particularly, the present invention relates to a method and a system for delivering multicasting data services on different wavelengths using a configurable four-port wavelength selective crossbar switch (4WCS).

2. Description of the Related Art

Multicasting is achieved by duplicating multicast packets multiple times for each receiver in a traditional data communication network, but this approach has the disadvantage of creating a bottleneck at the multicast server. There are also proposals for generating a virtual tree network architecture and broadcast data on the virtual tree. Nevertheless, these proposals incur signaling difficulties and Quality of Service issues, such as local bandwidth bottlenecks and latency issues.

Rapid improvements in the cost and performance has made wavelength division multiplexed (WDM) technology an attractive technology for regional and metropolitan area networks. See, for example, A. A. M. Saleh et al., "Architectural Principles of Optical Regional and Metropolitan Access Networks," J. Lightwave Technology, Vol. 17, No. 12, p 2431–2448, December 1999.

Accordingly, what is needed is a technique for multicasting in an optical telecommunication network in which the multicast signal is duplicated on multiple wavelengths in a WDM system using a shared common remote modulator. Additionally, what is needed is a technique for changing the multicast group by dynamically configuring the wavelengths reaching the remote modulator using a wavelength selective crossbar switch.

BRIEF SUMMARY OF THE INVENTION

The present invention provides a technique for selectively and dynamically changing a wavelength configurable crossbar switch for modulating selected wavelengths of a wavelength division multiplexed (WDM) signal with content data. The present invention also provides a technique for providing node-to-node communication on a remotely modulated ring carrier. Additionally, the present invention provides a technique for selectively multicasting on different wavelengths of a WDM signal.

The advantages of the present invention are provided by a method and a system for multicasting data services on an optical network. According to the invention, a wavelength division multiplexed (WDM) signal having a plurality of wavelengths is received from a hub node of the optical network, such as a unidirectional ring network or a bi-directional ring network. That is, the WDM signal includes a plurality of wavelengths for multicast data and at least one wavelength for non-multicast data. A four-port wavelength crossbar switch (4WCS) selectably switches each wavelength for multicast data from the optical network to a modulator loop. The modulator loop includes a multicast modulator that modulates the plurality of wavelengths that are for multicast data with the multicast data. Each modulated wavelength is then switched from the modulator loop to the optical network by the 4WCS switch, and sent to a plurality of subscriber nodes of the optical network.

According to one aspect of the present invention, wavelengths are selectively separated from the WDM signal for reconfiguring delivery of multicast data by remote control, without manual changes being made to a device selectively separating the wavelengths from the WDM signal.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention relates to a method and an apparatus for multicasting data services on different wavelengths using a configurable four-port wavelength crossbar switch (4WCS). According to the present invention, a wavelength-specific optical carrier can reside on a network provider's location while multicast data modulation resides at a separate content-provider location. By configuring a 4WCS, a service provider can imprint the multicast data onto the selected wavelengths for delivery to users downstream, the provider of the network infrastructure can maintain network integrity, such as, wavelength accuracy, crosstalk power levels, etc.

Figure 1:
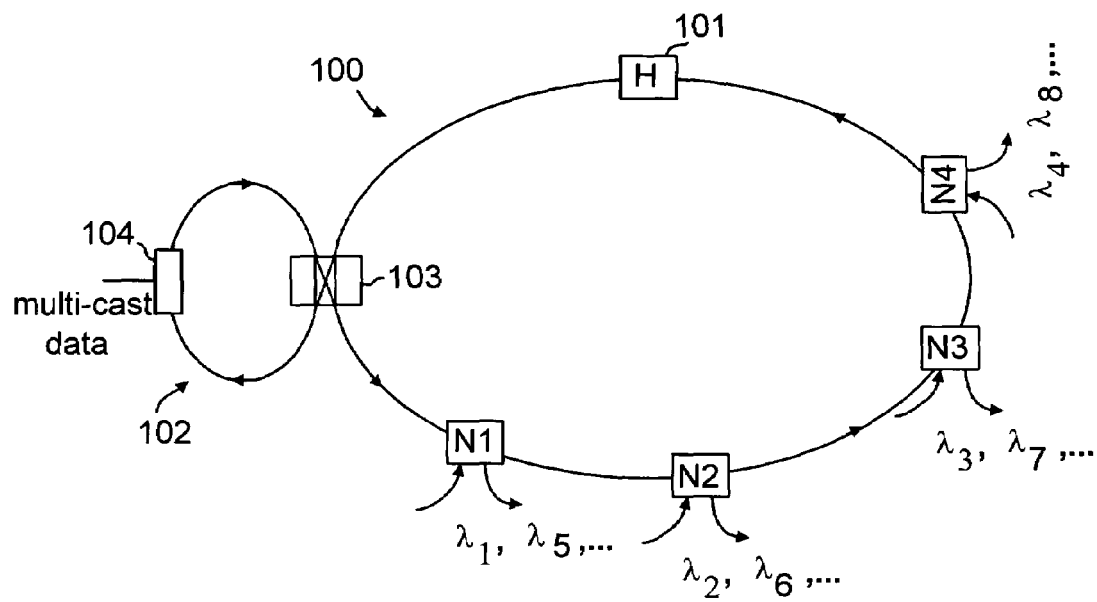
FIG. 1 shows a functional block diagram of an exemplary unidirectional regional area network providing multicasting of data services on different wavelengths using a configurable four-port wavelength crossbar switch (4WCS) according to a first embodiment of the present invention.

To enable multiple service providers to share the infrastructure cost of a metropolitan area network (MAN), a number of wavelengths can be reserved for multicast services. FIG. 1 is a functional block diagram of a unidirectional MAN 100 providing multicasting of data services on different wavelengths using a configurable four-port wavelength crossbar switch (4WCS) according to a first embodiment of the present invention. MAN 100 includes a hub node 101, a modulator loop 102, and a plurality of user nodes $N_1$–$N_4$. Hub node 101 sends out signals having standard wavelengths. Modulator loop 102 is connected to MAN 100 by a four-port wavelength selective crossbar switch (4WCS) 103. Four-port crossbar switch 103 can operate based on, for example, diffraction gratings combined with spatial light modulator arrays, tunable fiber gratings with circulators and wavelength slicers, or arrayed waveguide gratings (AWG) combined with optical switches.

Optical sources (not shown) are preferably located at hub node 101, and are under the control of the network provider. A content provider encodes multicast data using an optical modulator MOD 104 that is part of modulator loop 102. While FIG. 1 shows hub node 101 and modulator loop 102 as separate nodes, the functions of hub node 101 and modulator loop 102 can alternatively be combined into a single node. Each user node $N_1$ to $N_4$ respectively receives a multicast wavelength $\lambda_1$ to $\lambda_4$, in addition to other assigned wavelengths, in this example, wavelengths $\lambda_5$ to $\lambda_8$, respectively.

Switch 103 sets all multicast wavelengths used by the multicast data provider at modulator loop 102 to the "cross" state, while all other wavelengths are set to the "bar" state. When a multicast wavelength is set to the cross state in switch 103, the wavelength passes through MOD 104 and receives the multicast data before being routed back onto MAN 100. When a wavelength is set in the bar state, the barred wavelength passes directly through switch 103 without any modulation.

Optical modulator MOD 104, such as an external Mach-Zehnder modulator, simultaneously modulates all multicast wavelengths of the service subscribers in a well-known manner, thereby sharing modulation costs. Moreover, different content provider can share the wavelength-specific optical carriers generated by the hub node, thereby providing a significant cost advantage. Subscribers may be added or removed simply by switching the state of switch 103 in a dynamic manner from a remote location without making manual changes to switch 103. An optical amplifier may be inserted in modulator loop 102 for compensating for insertion losses.

Alternatively, a switched semiconductor amplifier may combine both modulation and amplification for the most economical solution.

Increasing the number of wavelengths in the ring and adding routing devices in modulator loop 102 can accommodate diverse service packages from a content provider. Thus, services can be provisioned flexibly, from a single service that spans several wavelengths, to services that are segregated by wavelength, to multiple services broadcast on a single wavelength and shared over several nodes. Additional content providers at other nodes, including content provided from the hub node 101 can be accommodated on wavelengths not routed to the content provider operating modulator loop 102.

Figure 2:
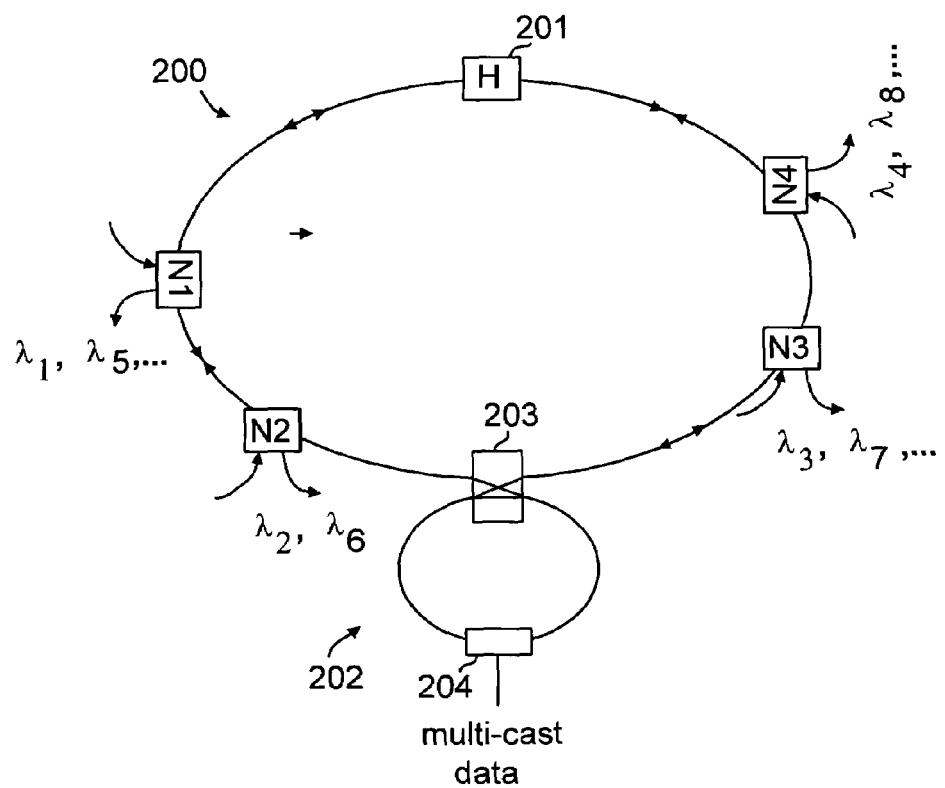
FIG. 2 shows a functional block diagram of a bidirectional regional area network providing multicasting of data services on different wavelengths using a configurable four-port wavelength crossbar switch (4WCS) according to a second embodiment of the present invention.

In the situation that modulator loop 102 is not on the upstream of all the user nodes ($N_1$ to $N_4$ in FIG. 1), a bi-directional ring is required to support users on either side of modulator loop 102. FIG. 2 is a functional block diagram of a bidirectional metropolitan area network (MAN) 200 providing multicasting of data services on different wavelengths using a configurable four-port wavelength selective crossbar switch (4WCS) according to a second embodiment of the present invention. In this embodiment, the 4WCS must operate bidirectionally. In FIG. 2, a modulator loop 202 that includes a modulator 204 is provided in the "middle" of the MAN 200, that is, modulator loop 202 is physically located in MAN 200 so that at least one subscriber node N is located in either direction around MAN 200. Modulator loop 202 is connected to MAN 200 by a four-port wavelength crossbar switch (4WCS) 203. Accordingly, the clockwise wavelengths that are generated by hub node 201 are modulated by modulator loop 202 and the multicast signal is sent to local nodes (nodes N1 and N2) in the clockwise direction from modulator loop 202. Local nodes (nodes N3 and N4) in the counter-clockwise direction from modulator loop 202 receive the counter-clockwise wavelengths generated by hub node 201 and that have been modulated by modulator loop 202. The clockwise and counter-clockwise traffic may be on two different fibers, or may be on the same fiber, but have different wavelengths. When the counter-clockwise and clockwise wavelengths are all on the same fiber, wavelengths may even share a single modulator for the same multicast signal, provided that the modulator itself can operate bidirectionally.

Figure 3:
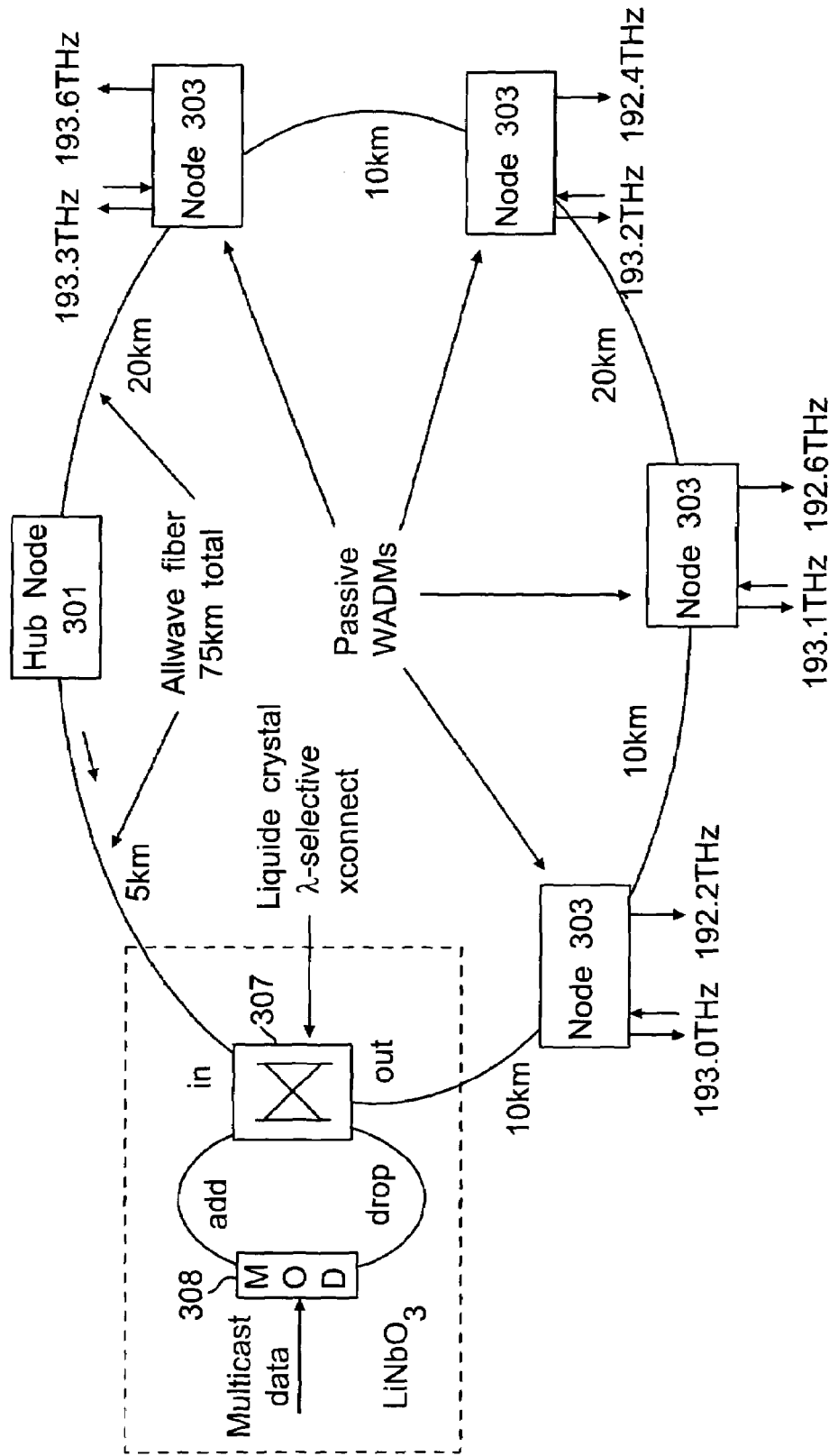
FIG. 3 shows a functional block diagram of an experimental WDM ring network that was used for demonstrating the present invention.

FIG. 3 shows a functional block diagram of an experimental WDM ring network 300 that was used for studying the architecture and technology of metropolitan and regional optical access networks, and for demonstrating the present invention. Details regarding experimental WDM ring network 300 are provided in C.F. Lam et al., "Demonstration of programmable optical multicasting in a regional/metro area network", IEEE Photonics Technology Letters, vol. 13, pp. 1236–1238 (2001). WDM ring network 300 included a network operator hub node 301, an independent content node 302 that was remotely located from node 301, and four subscriber nodes 303–306. All of the wavelengths used in network 300 are on the standard 100 GHz ITU grid. Network 300 also had a total circumference of 75 km formed from Allwave™ fiber, which is available from Lucent Technologies, Inc. The various nodes forming experimental ring network 300 were physically separated from 5 km to 20 km apart, as indicated in FIG. 3. All of the traffic used for the study consisted of a $2^{31}$–1 pseudo-random bit sequence (PRBS) at 2.488 Gb/s.

Figure 4:
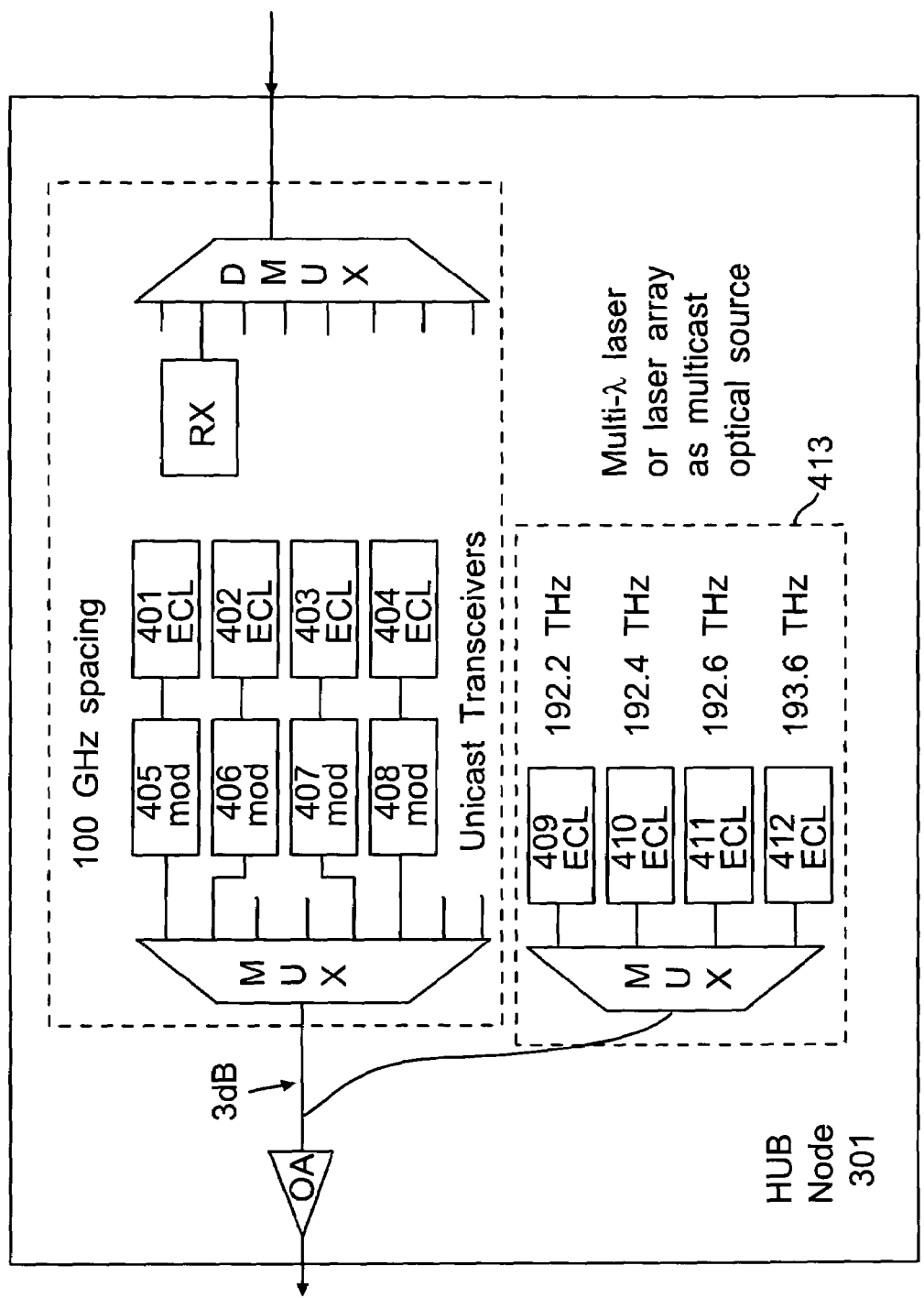
FIG. 4 is a functional block diagram showing details of hub node as used in the experimental ring network shown in FIG. 3.

FIG. 4 is a functional block diagram showing details of hub node 301 as used in experimental ring network 300. Hub node 301 included four external cavity lasers (ECL) 401–404 having 193.0–193.3 THz frequencies and respectively had external modulation 405–408 for sending unicast (point-to-point) downstream traffic to each individual subscriber node 303–306. At the same time, a multi-wavelength laser, simulated by an array of four ECL lasers 409–412, respectively having frequencies 192.2, 192.4, 192.6 and 193.6 THz, was used as a multicast wavelength source 413 for carrying multicast traffic to individual subscribers.

A remotely-located content node 302 generated the multicast data. Content node 302 was connected to ring network 300 using a Corning Pure Path™ wavelength selective cross-connect (WSS) 307. WSS 307 was a liquid crystal based 2×2 four-port device, such as described by A. R. Ranalli et al., "Liquid Crystal-Based Wavelength Selectable Cross-Connect," ECOC 1999, Nice, France. WSS 307 operated on 80 ITU wavelengths having 50 GHz spacing, and had a measured insertion loss of about 4 dB for all the wavelengths in both the bar and cross states. Switch 307 could be selectively set into either a cross state or a bar state for each of the input wavelengths using a digital controller (not shown). The crosstalk between the cross and bar states was less than −40 dB.

WSS 307 at content node 302 was set to the bar state for all the unicast wavelengths so that the unicast signals would bypass (i.e., not be affected by) content node 302. A multicast wavelength could be set into either the bar or cross state at WSS 307. When a multicast wavelength was set into the bar state, the multicast wavelength bypassed content node 302 without being modulated. When, however, a multicast wavelength was set into the cross state, the multicast wavelength would pass through a $LiNbO_3$ external modulator 308, which modulated the input optical signal using the multicast data. Thus, by controlling the multicast wavelengths in the bar or cross state, a content node can selectively send the same multicast data to any appropriate subscriber node. Modulator 308 was wavelength independent and was shared by all the multicast wavelengths in the cross state. Modulator 308 imposed the multicast data onto all wavelengths passing through modulator 308 from the "drop" port of WSS 307, shown in FIG. 3. The multicast wavelengths were inserted back into ring network 300 from the "add" port of WSS 307.

The modulator that was used in content node 302 was polarization dependent. The launch polarizations of the multicast sources were adjusted to match that of the modulator. Alternatively, a polarization independent $LiNbO_3$ modulator could have been used. In that regard, see T. Ishikawa, "Polarization independent $LiNbO_3$ waveguide modulator for bidirectional transmission," Electron. Lett., Vol. 28, No. 6, pp. 566–567, 1992. As another alternative, electro-absorptive modulators could be used for multicast content modulation. See, for example, Data Sheets of Electro-Absorption Modulator, Japan Aviation Electronics Industry, Ltd.

Figure 5:
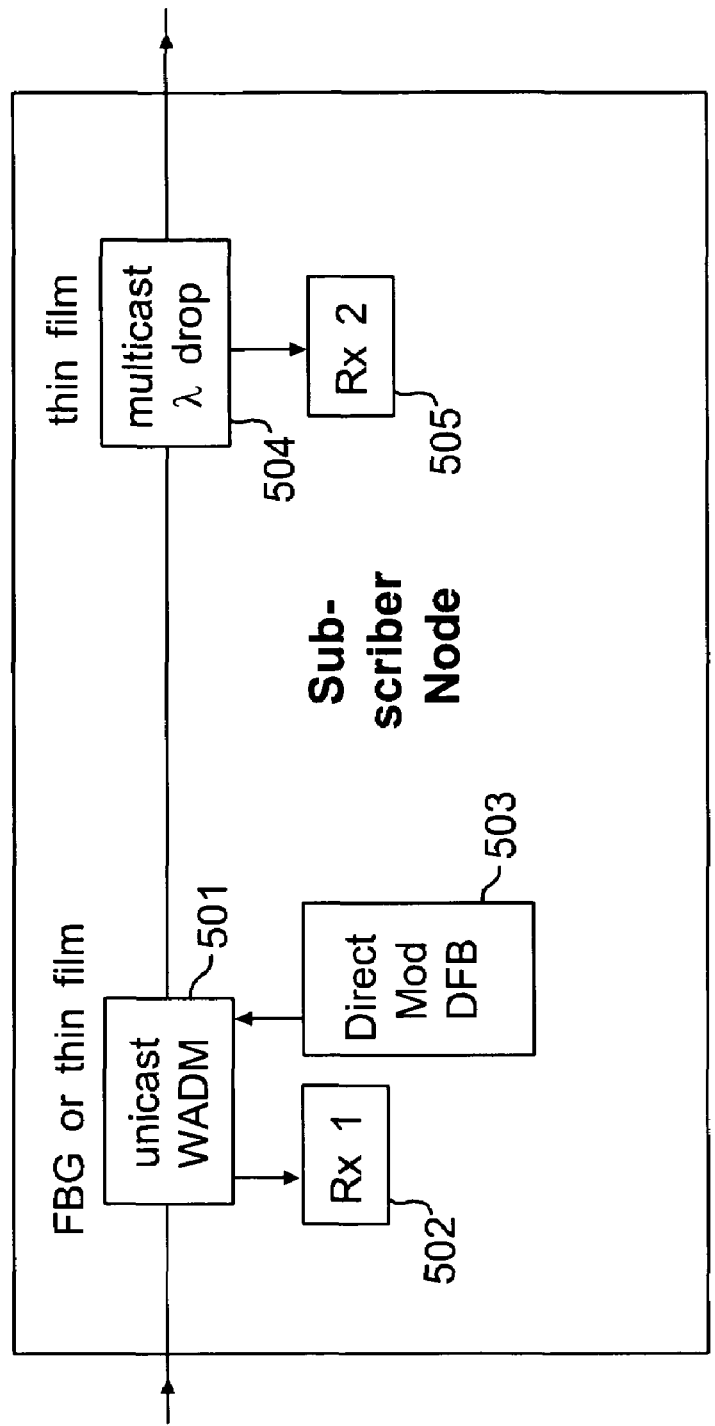
FIG. 5 shows a functional block diagram of a subscriber node that was used in the experimental ring network shown in FIG. 3.

FIG. 5 shows a functional block diagram of a subscriber node 303–306 that was used in experimental ring network 300. Each subscriber node 303–306 included two separate passive wavelength add/drops 501 and 502. In this regard, each subscriber node 303–306 dropped a downstream unicast wavelength from hub node 301 and added the same wavelength as upstream traffic to hub node 301 using a passive wavelength add/drop multiplexer (WADM) 501. Both fiber Bragg gratings at subscriber nodes 303 and 304, and thin film filters at subscriber nodes 305 and 306 were used as unicast traffic add/drops. A unicast receiver 502 received the dropped wavelength. The upstream traffic was produced by a directly modulated DFB laser 503 at each individual node. In addition to the unicast wavelength, each subscriber node also dropped an additional multicast wavelength using a thin film add/drop filter 504 that was received by a multicast receiver 505, as shown in FIG. 5.

Alternatively, the separate functions provided by add/drops 501 and 502 could be combined by using a wavelength cyclic add/drops, such as disclosed by M. D. Feuer et al., "Upgradeable Metro Networks Using Frequency-Cyclic Optical Add/Drop," Optical Fiber Communication Conference 2001, paper WBB5, March 17–21, Anaheim, Calif. Each wavelength cyclic add/drop is capable of adding/dropping combs of periodic wavelength components. Additionally, as accessible wavelengths become more abundant and less expensive than installed fiber, free spectral ranges (FSRs) can be used for different services, i.e., one FSR for point-to-point unicast service and another FSR for point-to-multi-point multicast services. Accordingly, different FSRs would be separated at the subscriber nodes using intermediate WDMs.

Figure 6:
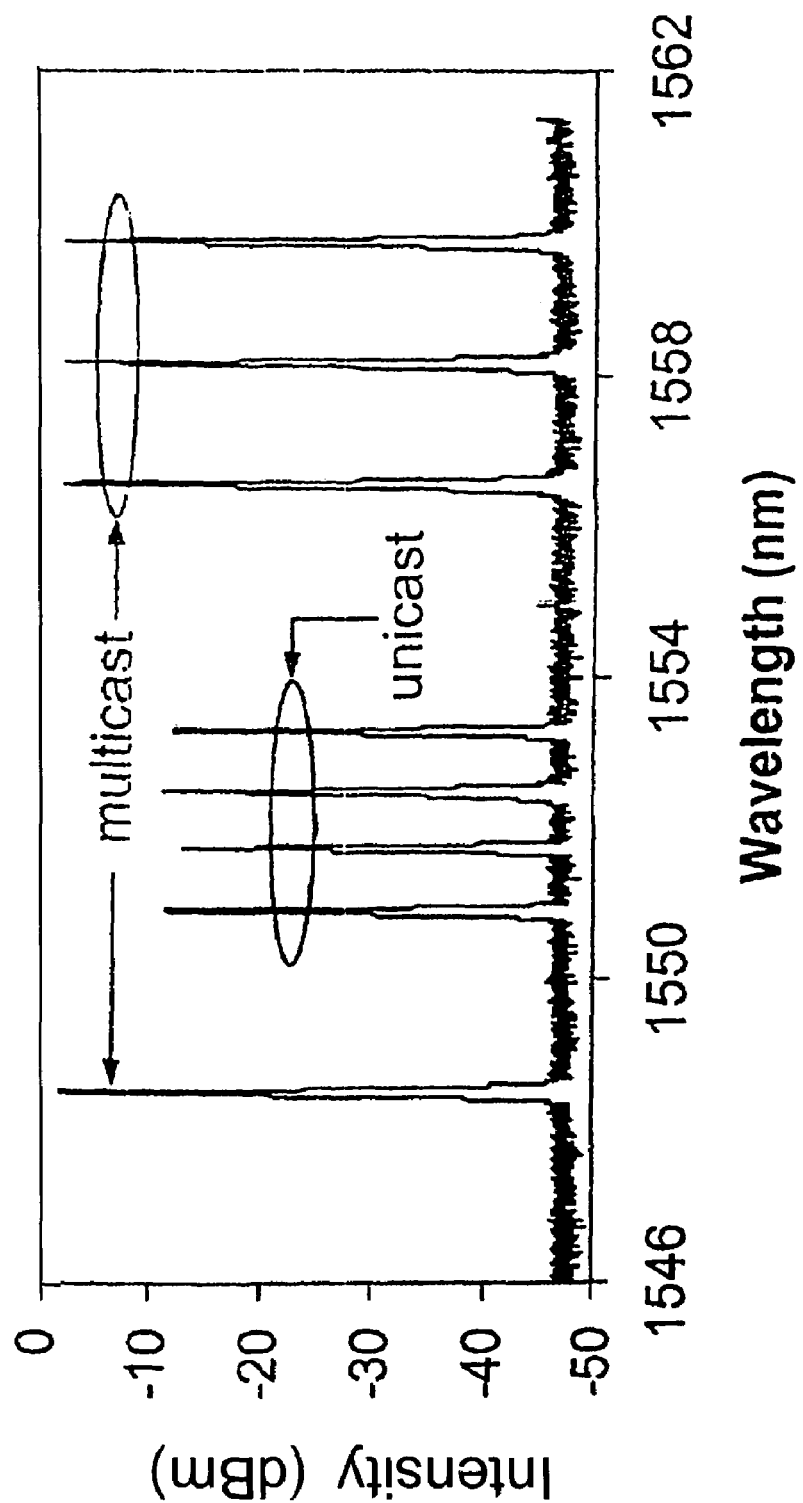
FIG. 6 shows a spectrum of the wavelengths that were used for the experimental ring network shown in FIG. 3.

FIG. 6 shows a spectrum of the wavelengths that were used for experimental ring network 300. The multicast wavelengths were selected according to the particular wavelength add/drop multiplexers (WADMs) that were available at the time. Alternatively, multi-wavelength lasers, such as a DFB or a DBR array as disclosed by, for example, M. G. Young et al., "A 16×1 wavelength division mulitplexer with integrated distributed Bragg reflector lasers and absorption modulators," IEEE Phot. Tech. Lett., 5(8): 908–910 (1993)), or a multi-frequency laser as disclosed by, for example, M. Zirngibl, et al., "Characterization of a multiwavelength waveguide grating router laser," IEEE Phot. Tech. Lett., 6:1082–1084 (1994)), having a comb of output frequencies could have been used as sources.

The unicast traffic and the multi-wavelength source outputs were multiplexed using a 3 dB coupler (in principle, a wavelength division multiplexer) and amplified by a post amplifier. The rest of experimental ring network 300 had no optical amplifiers. At the hub output, each unicast wavelength has an output power of −1 dBm, while each multicast wavelength has an output power of 9 dBm because the multicast wavelengths suffered more loss at the content node, as shown in FIG. 6. For larger scale networks having longer distances between nodes, more nodes or higher bit rates, optical line amplifiers could be used for enhancing the power budget. Conventional Erbium-doped fiber amplifiers (EDFAs), Erbium-doped waveguide amplifiers (EDWAs) and solid state optical amplifiers (SOAs) are lower cost candidates for metro-optical networks that can be integrated with WADMs for improving the network scalability. In this regard, see, for example, P. Iannone et al., "A 160-km Transparent Metro WDM Ring Network Featuring Cascaded Erbium-Doped Waveguide Amplifiers," paper WBB3, OFC Technical Digest 2000.

Figure 7B:
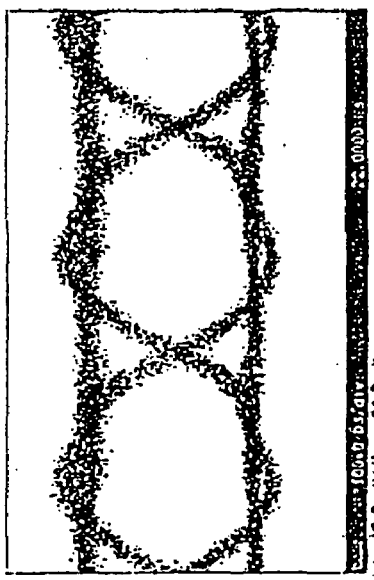
FIGS. 7A–7D show the received open eye patterns at the subscriber nodes in the experimental ring network shown in FIG. 3.
Figure 7D:
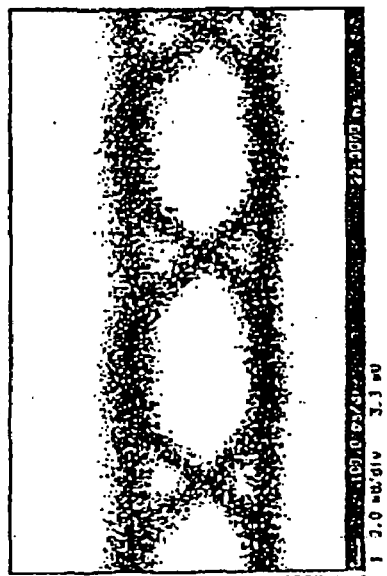
Figure 7A:
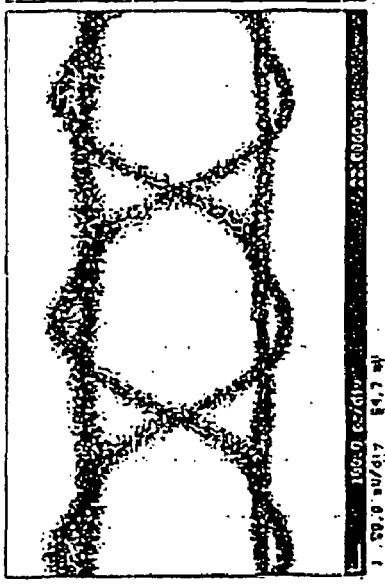
Figure 7C:
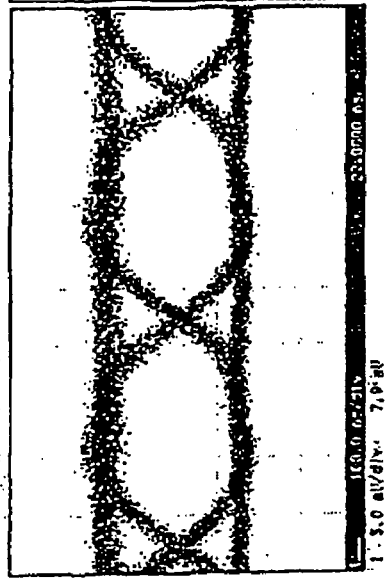
Figure 8:
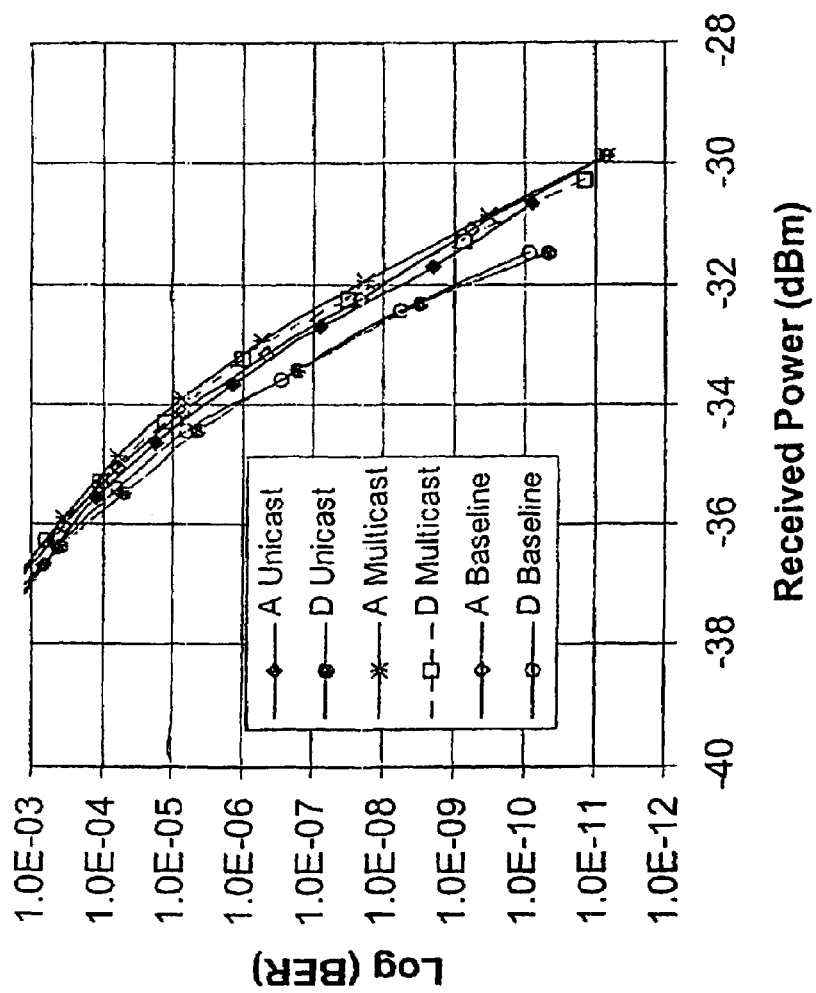
FIG. 8 shows the measurement results for two selected subscriber nodes of the experimental ring network shown in FIG. 3.

All the multicast wavelengths were individually set to the bar and cross states. A bit error rate (BER) and an eye diagram measurement were performed on each of the multicast and downstream unicast channels. The same PRBS sequence with different electrically delayed phases was applied to different modulators in the system. When a multicast wavelength was set to the cross state, the multicast receiver at a corresponding subscriber node 303–306 showed a clear open eye with error free reception, as shown in FIGS. 7A–7B, which respectively show the received open eye pattern at subscriber nodes 303–306. To verify the overall system performance, all of the data channels were turned on and a worst-case bit-error rate measurement was performed for each individual channel. The measurement results at nodes 303 and 306 are plotted in FIG. 8. For clarity, similar results that were obtained for nodes 304 and 305 are omitted from FIG. 8. The sensitivity for all the channels at $10^{-9}$ BER was between −30 dBm and −32 dBm. There was no error floor measured in the experiment. FIG. 8 also includes the base line back-to-back BER between the receiver and the transmitter for unicast traffic. Essentially, no penalty due to the WSS and multicast channels was detected. The upstream channel performance has been studied and reported in M. D. Feuer et al., "Crosstalk in a Metro-Scale Ring with Passive Optical Add/Drop," paper ThB4, Proceedings of IEEE LEOS 2000, pp. 694–695, Nov. 13–16, 2000, Rio Grande, Puerto Rico. The addition of the multicast signals produced no further degradation to the upstream signals.

Although a laser diode array was used in the experimental ring network, a multi-wavelength output source and WSS could have been used for this type of application. Furthermore, the multi-wavelength source, the modulator and drive electronics could all be shared among subscribers. For example, the content provider could be a CATV primary headend and the subscribers could be secondary headends, such as disclosed by Oleh Sniezko et al., "HFC Architecture in the Making," CED, vol. 25, no. 7, July 1999. In such a case, the content could be digital TV signals using QAM modulation schemes. For example, DirectTV™ employs QPSK modulation and strong forward error correction (FEC). Such signal requires only a 6 dB signal-to-noise ratio (SNR) and is sufficiently robust to be distributed on a digital optical link. To achieve a $10^{-9}$ BER without FEC, the required SNR for QPSK and 16-QAM modulation is 16 dB and 24 dB respectively. These values are close to the requirements for on-off keyed digital signals (15 dB), and can be easily achieved in a metro-scale WDM network. Distribution of broadcast digital TV signals on passive WDM optical networks has been demonstrated before, such as disclosed by K. C. Reichmann et al., "Simultaneous Delivery of 1280 Video Channels over a WDM Passive Optical Network," Proceedings of 26th European Conference on Optical Communication, Vol. 3, pp. 79–80, Sep. 3–7, 2000, Munich, Germany.

In experimental ring network 300, the unicast lasers were conveniently separated from the multicast laser. In reality, the output of the unicast lasers could also be used by content node 302 by simply turning off the unicast modulators at hub node 301. Thus, the laser sources can be shared between hub node 301 and content node 302. By consolidating all laser sources at a service provider hub node, the content node would be freed from ensuring the correct output wavelengths and the optical source integrity. Consequently, the service provider would provide and monitor all wavelength sources from a central location. Further, the multi-wavelength sources could be shared among several service providers.

Figure 9:
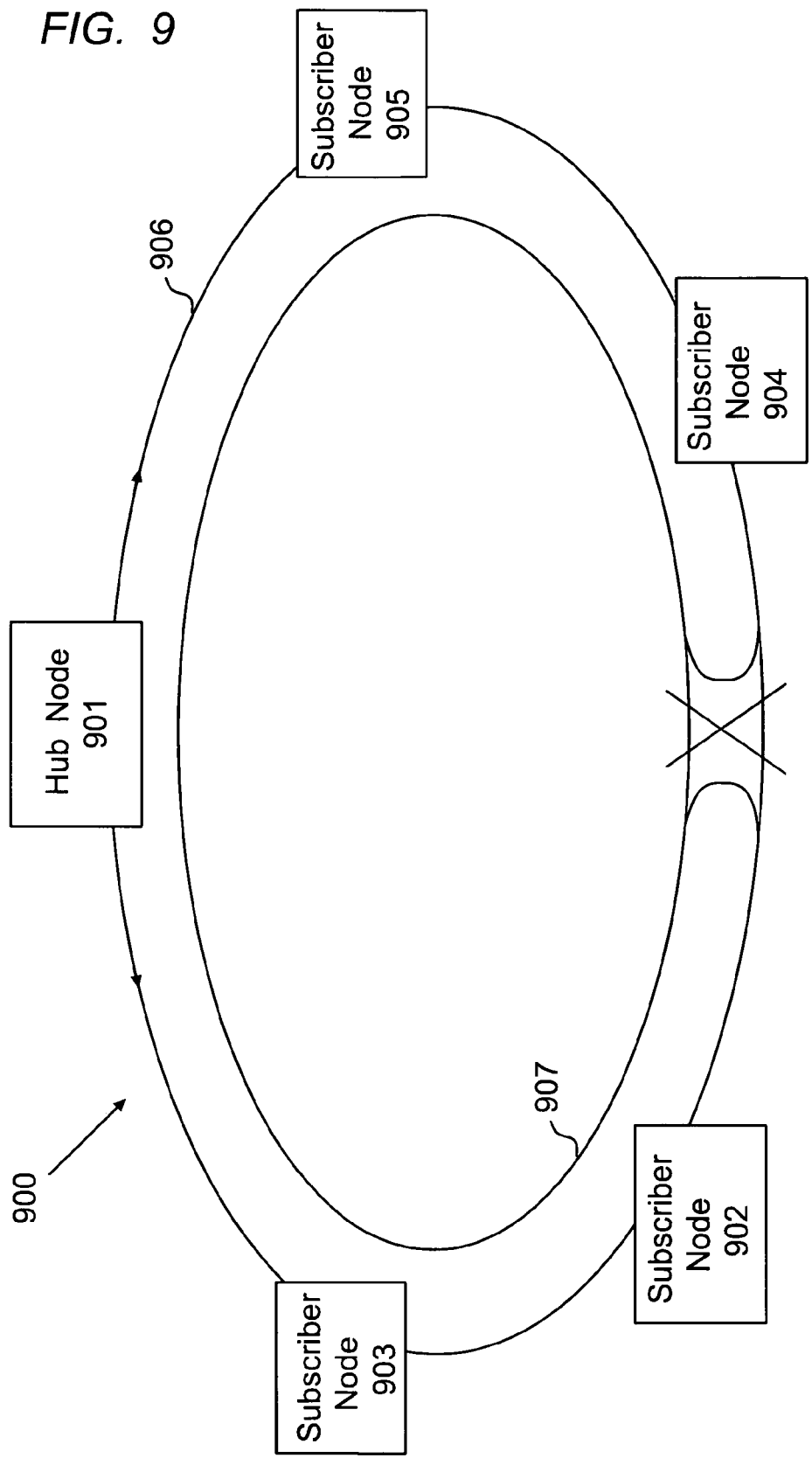
FIG. 9 shows an exemplary configuration of a bidirectional ring network with a protection mechanism according to the present invention.

FIG. 9 shows an exemplary configuration of a bidirectional ring network 900 according to the present invention. The clockwise traffic uses different wavelengths than the counter-clockwise traffic. In bi-directional ring network 900, a content node 902 can be located anywhere in the ring. Multicast wavelengths are transmitted in both directions from a hub node 901, passing through content node 902 and reaching all of the subscriber nodes 903–905. For bi-directional network 900, the WADMs on ring fiber 906 would be bidirectional add/drops, such as thin film filters. The remote modulator and the 2×2 WSS (both not shown) are both bi-directional and reversible. A protection fiber 907 is also shown. In the case of a cut fiber, a loop back mechanism, as shown in FIG. 9, restores the traffic in ring fiber 906. This restoration scheme works because of the optical transparency and bi-directionality of the node add/drop devices.

Another alternative configuration for a ring network according to the present invention would be to cascade more than one content node. In this alternative configuration, wavelengths could be shared back and forth between the content nodes.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method for multicasting data services on an optical network, the method comprising steps of:
   receiving a wavelength division multiplexed (WDM) signal from a hub node of the optical network, the WDM signal including a plurality of wavelengths;
   separating at least one wavelength from the plurality of wavelengths of the WDM signal;
   switching each separated wavelength for multicast data from the optical network to a modulator loop,
   modulating each separated wavelength with multicast data;
   recombining each separated wavelength with each wavelength of the WDM signal that was not separated from the WDM signal;
   switching each modulated wavelength from the modulator loop to the optical network, and
   sending the modulated WDM signal to a plurality of subscriber nodes of the optical network for delivering the multicast data.

2. The method according to claim 1, wherein the step of separating at least one wavelength includes a step of selectively separating at least one wavelength for reconfiguring delivery of multicast data.

3. The method according to claim 2, wherein the step of selectively separating at least one wavelength is controlled remotely, without manual changes being made to a device selectively separating the at least one wavelength.

4. The method according to claim 1, wherein the WDM signal includes a plurality of wavelengths for multicast data and at least one wavelength for non-multicast data.

5. The method according to claim 1, wherein the steps of switching are performed by a four-port wavelength crossbar switch (4WCS).

6. The method according to claim 5, wherein each step of switching selectably switches at least one selected wavelength.

7. The method according to claim 1, wherein the optical network is a unidirectional ring network.

8. The method according to claim 1, wherein the optical network is a bidirectional ring network.

9. A system for multicasting data services on an optical network, the system comprising:
   a plurality of subscriber nodes coupled to the optical network;
   a hub node coupled to the optical network, the hub node generating a wavelength division multiplexed (WDM) signal, the WDM signal including a plurality of signal wavelengths;
   an optical switch separating at least one selected wavelength from the WDM signal; and
   a modulator loon coupled to the optical switch and receiving each separated wavelength, the modulator loop modulating each separated wavelength with multicast data, the optical switch recombining each separated wavelength with each wavelength of the WDM signal that was not separated from the WDM signal and sending the modulated WDM signal to the plurality of subscriber nodes of the optical network for delivering the multicast data.

10. The system according to claim 9, wherein the selection device selectively separates at least one wavelength reconfiguring delivery of multicast data.

11. The system according to claim 10, wherein the selection device is controlled remotely, without manual changes being made to the device for selectively separating the at least one wavelength.

12. The system according to claim 9, wherein the WDM signal includes a plurality of wavelengths for multicast data and at least one wavelength for non-multicast data.

13. The system according to claim 9, wherein the WDM signal includes a plurality of wavelengths for multicast data and at least one wavelength for non-multicast data, and wherein the modulator node includes a multicast modulator modulating each wavelength for multicast data with the multicast data in the modulator node.

14. The system according to claim 9, wherein the selection device is a fourport wavelength crossbar switch (4WCS).

15. The system according to claim 14, wherein the switch selectably switches at least one selected wavelength.

16. The system according to claim 9, wherein the optical network is a unidirectional ring network.

17. The system according to claim 9, wherein the optical network is a bidirectional ring network.

* * * * *